(12) United States Patent
Rahman et al.

(10) Patent No.: US 7,912,437 B2
(45) Date of Patent: Mar. 22, 2011

(54) RADIO FREQUENCY RECEIVER HAVING DYNAMIC BANDWIDTH CONTROL AND METHOD OF OPERATION

(75) Inventors: Mahibur Rahman, Lake Worth, FL (US); Charles LeRoy Sobchak, Davie, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 1070 days.

(21) Appl. No.: 11/621,355

(22) Filed: Jan. 9, 2007

(65) Prior Publication Data
US 2008/0165899 A1 Jul. 10, 2008

(51) Int. Cl.
H04B 1/10 (2006.01)
(52) U.S. Cl. .................. 455/296; 455/232.1; 455/245.1; 375/319; 375/345
(58) Field of Classification Search .................. 455/296, 455/114.2, 115.1, 127.1, 127.2, 130, 136, 455/200.1, 226.1, 260, 6, 425, 426, 456.5, 455/456.6, 561, 550.1, 575.1, 63.1, 501, 455/250.1, 2, 781, 232.1–251.1; 375/319, 375/346, 345
See application file for complete search history.

(56) References Cited

U.S. PATENT DOCUMENTS

| | | | |
|---|---|---|---|
| 5,748,681 A | 5/1998 | Comino et al. | |
| 5,757,858 A * | 5/1998 | Black et al. | 375/295 |
| 6,114,980 A | 9/2000 | Tilley et al. | |
| 6,356,217 B1 | 3/2002 | Tilley et al. | |
| 6,366,622 B1 * | 4/2002 | Brown et al. | 375/322 |
| 6,560,447 B2 | 5/2003 | Rahman et al. | |
| 6,606,359 B1 | 8/2003 | Nag et al. | |
| 6,668,164 B2 * | 12/2003 | Hughes | 455/234.1 |
| 6,690,740 B1 | 2/2004 | Mattisson et al. | |
| 7,058,364 B2 | 6/2006 | Atkinson et al. | |
| 7,076,225 B2 * | 7/2006 | Li et al. | 455/245.1 |
| 7,136,431 B2 | 11/2006 | Shi et al. | |
| 7,215,722 B2 * | 5/2007 | Hsiao | 375/319 |
| 2002/0001354 A1 * | 1/2002 | McNally | 375/317 |
| 2003/0199264 A1 * | 10/2003 | Holenstein et al. | 455/324 |
| 2003/0203728 A1 | 10/2003 | Filipovic | |
| 2003/0207674 A1 * | 11/2003 | Hughes | 455/234.1 |
| 2004/0071238 A1 | 4/2004 | Khlat et al. | |
| 2004/0146128 A1 | 7/2004 | Cuje et al. | |
| 2006/0222117 A1 | 10/2006 | Rahman et al. | |
| 2006/0227910 A1 | 10/2006 | Ramasubramanian et al. | |

OTHER PUBLICATIONS

U.S. Appl. No. 11/452,457, filed Jun. 14, 2006, Rahman et al.

* cited by examiner

*Primary Examiner* — Duc Nguyen
*Assistant Examiner* — Charles Chow (57) ABSTRACT

A radio frequency receiver (102) includes at least one amplifier (108, 114 and 122) for amplifying a signal received by the radio frequency receiver, an automatic gain control system (158) for controlling a gain of the at least one amplifier, and a direct current offset correction filter (142) for reducing any direct current component of the signal amplified by the at least one amplifier. The direct current offset correction filter has a bandwidth that is dynamically controlled by a change in the gain of the at least one amplifier. The radio frequency receiver also includes a digital automatic gain control unit (150) having a bandwidth that is dynamically controlled by the change in the gain of the at least one amplifier.

20 Claims, 5 Drawing Sheets

RADIO FREQUENCY RECEIVER HAVING DYNAMIC BANDWIDTH CONTROL AND METHOD OF OPERATION

BACKGROUND

1. Field

This invention relates generally to radio frequency (RF) receivers, and more specifically to direct current (DC) offset correction in a receiver with an automatic gain control.

2. Related Art

A DC offset is a voltage that may appear at an output of a mixer of a zero intermediate frequency (IF) receiver in the absence of a received signal. The DC offset can be caused by leakage current from a local oscillator to the mixer of the zero-IF receiver. The DC offset is added to, and becomes an unwanted part of, the received signal. The DC offset is of concern in receivers that are implemented substantially in integrated circuit form because techniques to mitigate the DC offset, such as suitable blocking capacitors, are not readily available in integrated circuits. Baseband DC offset correction is commonly used in zero-IF receivers to reduce or eliminate DC offsets. Elimination of the DC offset is desirable to avoid clipping within the baseband analog signal path as well as to meet a desired receiver performance, e.g., receiver sensitivity, under weaker signal conditions.

A critical receiver performance metric used for high-speed downlink packet access (HSDPA or 3.5 G) transceivers is the receiver error vector magnitude (EVM) performance under both on-channel signal-only and interferer test cases. HSDPA transceivers require a receiver EVM of around 5% to achieve desired network throughput at signal levels of −60 dBm and higher. Receiver EVM performance is typically required to be 5% under on-channel signal-only test cases at antenna signal levels of −60 dBm and higher. Receiver EVM performance is typically required to be approximately 10% for adjacent channel interferer test cases.

To achieve this type of receiver EVM performance, a DC notch, i.e., a high-pass notch, in the receiver of 1-kHz or less should be maintained. This requirement causes a fine DC offset correction filter or system, and a digital automatic gain control (DAGC) unit, in such receivers to maintain loop bandwidths of 1-kHz or less. Maintenance of such narrow DC notch bandwidths in the fine DC offset correction filter or system, and in the DAGC unit, causes the receiver to be unable to quickly track out large DC and gain errors introduced in the receiver whenever an RF/IF AGC system of the receiver alters RF and/or baseband gain settings. This inability leads to degraded receiver performance under fading channel conditions. The receiver EVM is significantly degraded when the DC notch in the receiver is increased beyond approximately 1-kHz. Furthermore, running the fine DC offset correction system and the DAGC unit continuously in a medium or high bandwidth mode of operation significantly degrades receiver EVM performance to an unacceptably large degree of more than 15%.

Known receivers lack the ability to both maintain a narrow DC notch (e.g., <1-kHz) in the receiver to optimize performance, such as EVM, under static channel conditions, and to dynamically alter the DC notch under fading channel conditions to optimize performance, such as block error rate, under fading channel conditions.

Most known DC offset correction techniques focus on methods for coarse DC offset correction. Known methods and apparatus focus on methods for mixed-signal coarse DC correction applied within the receive analog signal path. Known methods do not consider the interaction between RF/IF AGC, coarse DC offset correction, and fine DC offset correction systems, to continuously maintain a narrow fine DC offset correction notch in a receiver. Known methods do not consider interactions required between RF/IF AGC and digital AGC systems to maintain a low bandwidth in the digital AGC system. Known methods do not minimize the DC notch (e.g., due to fine DC offset correction and digital AGC systems) in receivers supporting continuous data reception, such as in HSDPA and wideband code division multiple access (WCDMA) systems.

An HSDPA system requires a frequency response that is relatively flat for any signal components greater than 1-kHz (thereby setting a maximum loop bandwidth of a DC offset correction system) in order to ensure a desired EVM performance. The HSPDA system and other systems, such as WCDMA and enhanced global packet radio systems, can require receiver warm-up times (i.e., the time until the receiver is providing accurately demodulated data) that are less than 100-μsec, which establishes a response time constraint for the DC offset correction system. Furthermore, if the receiver needs to track fading in the RF signal, the required response times may be even shorter.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
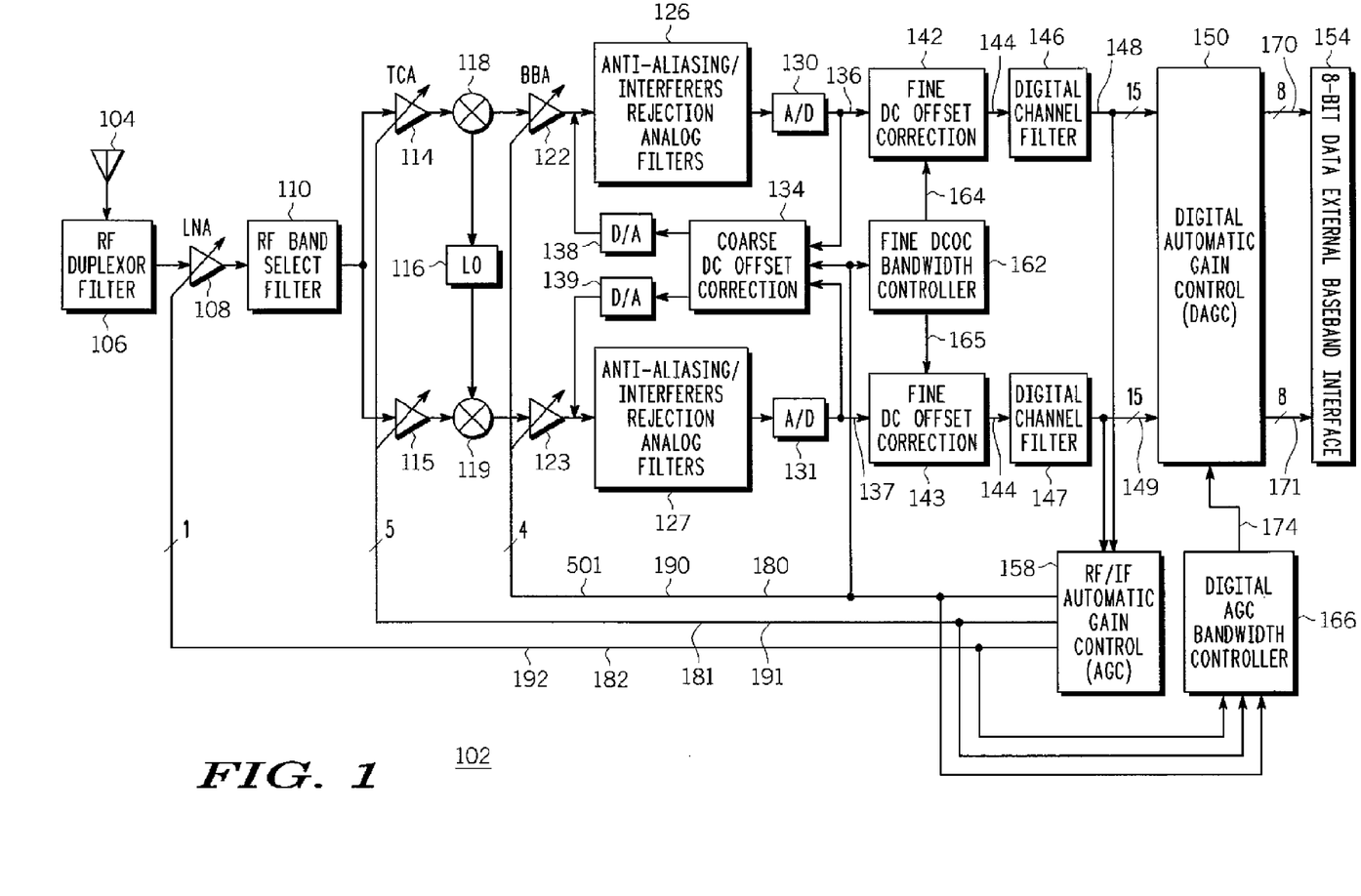
FIG. 1 is a simplified functional block diagram of a portion of a radio frequency receiver with dynamic bandwidth control of a fine DC offset correction system and dynamic bandwidth control of a digital AGC system.

FIG. 1 is a simplified functional block diagram of a portion of a radio frequency (RF) receiver 102 with dynamic bandwidth control of a fine DC offset correction (DCOC) system and with dynamic bandwidth control of a digital AGC (DAGC) system. The receiver 102 is zero-IF, or baseband, receiver with a high dynamic range. In an exemplary embodiment, the receiver 102 is a portion of a mobile, or wireless, telephone. Starting at an antenna 104, an RF front-end section of the receiver 102 includes an RF duplexer filter 106 and a power-stepped low noise amplifier (LNA) 108 that amplifies a signal from the antenna. The LNA 108 is a switched-gain amplifier with a gain that can be changed, via a control signal, from +16 decibels (dB), which corresponds to an "on" condition, to −4 dB, which corresponds to an "off" condition. Alternatively, the LNA 108 is a variable gain amplifier. The output of the LNA 108 is coupled to an RF band select filter 110 that selects a desired RF frequency band. The output of the RF band select filter 110 is coupled to an input of a transconductance amplifier (TCA) 114 and 115 that allows up to thirty-one (31) steps of fine gain control steps at RF.

The receiver 102 includes a local oscillator 116. The local oscillator 116 is usually produced by a frequency synthesizer (not shown) that operates at a frequency that is nominally equal to or near the frequency of the RF signal. Next, I/Q quadrature mixers 118 and 119 are employed to convert the RF signal to a zero-IF signal. The quadrature mixers 118 and 119 are driven by the local oscillator 116. One output of the local oscillator 116 is phase shifted by 90° to provide an I-phase (in-phase, or real, component) and a Q-phase (quadrature, or imaginary, component) to a respective baseband amplifier 122 and 123. The I-phase signal follows the top signal path, and the Q-phase signal follows the bottom signal path in FIG. 1. Therefore, the output signals of the quadrature mixers 118 and 119 are nominally at 0-Hz, plus any frequency error. The quadrature mixers 118 and 119 are usually the largest contributors to DC offset.

Following the quadrature mixer 118 and 119, baseband gain control is accomplished using a baseband amplifier (BBA) 122 and 123. The BBA 122 and 123 is a generally known variable gain amplifier with a gain that can be changed, via a gain control signal, over a pre-defined range and in pre-defined steps. The output of the BBA 122 and 123 is coupled to an analog low-pass filter 126 and 127. The analog low-pass filter 126 and 127 attenuates adjacent channel interferers and attenuates higher frequencies for A/D anti-aliasing purposes. The output of the low-pass filter 126 and 127 is coupled to an A/D converter 130 and 131. The output of the A/D converter 130 provides I samples. In the exemplary embodiment, the A/D converter 130 and 131 is a sigma delta based A/D converter operating, for example, to provide 12-bit samples. The A/D converter 130 and 131 has a finite dynamic range and provides significant output resolution over a relatively large signal amplitude range. Therefore, any DC offset at the input to the A/D converter 130 and 131 detracts from the dynamic range or otherwise contributes to nonlinear performance. Therefore, any DC offset should be removed, reduced or otherwise mitigated in some fashion prior to the input to the A/D converter 130 and 131. The I samples are coupled to a coarse DCOC system 134 and, subsequently, to a digital channel filter 146. The coarse DCOC system 134, using a coarse resolution DCOC D/A converter 138 and 139, minimizes DC offsets that are present at an output of the BBA 122 and 123. The coarse DCOC system 134 operates to detect and determine the level of any DC offset in the I-phase and Q-phase signal paths and to provide signals via the coarse resolution DCOC D/A converter 138 and 139 to an input of the low-pass filter 126 and 127 to reduce the coarse DC offset at the input to the A/D converter 130 and 131. During a power-up sequence of the receiver 102, the coarse DCOC system 134 estimates the baseband DC offsets for each baseband gain setting and stores the results in memory (not shown). Subsequently, whenever baseband gain settings are altered by an RF/IF AGC system 158, open loop correction values are read from this register file and applied to the coarse resolution DCOC D/A converter 138 and 139. The coarse DCOC system 134 eliminates long closed loop coarse DC tracking transients that would otherwise occur when using this open loop operation mode.

The output of the A/D converter 130 and 131 is coupled to an input of a fine DCOC filter 142 and 143 via coupling 136 and 137. A fine DCOC input signal 503 (see FIG. 5) from the output of the A/D converter 130 and 131 is fed into an input of the fine DCOC filter 142 and 143. A purpose of the fine DCOC filter 142 is to further reduce any DC component of the signal amplified by at least one amplifier of the receiver 102, including the stepped LNA 108, the TCA 114 and 115, and the BBA 122 and 123. Digital channel filter 146 and 147 is coupled to a DAGC unit 150 via coupling 148 and 149. The DAGC unit 150 functions as a digital gain normalization unit. The digital channel filter 146 and 147 eliminates all in-band interference and preserves only the desired channel.

The output from the channel filter 146 is also coupled to the RF/IF AGC system 158 where the power or amplitude level of the signal corresponding to the samples is determined, e.g., as a sum of squares, with appropriate filtering. This power or amplitude level is used to generate a gain control signal 182 via coupling 192, where the gain control signal switches the gain of the LNA 108. The RF/IF AGC system 158 is also coupled to the BBA 122 and the TCA 114 via coupling 190 and 191, respectively. The RF/IF AGC system 158 provides a set of gain control signals 180, 181 and 182 based on the signal level at the output of the channel filter 146 and 147, and based on gain status and non-uniform gain control steps of the amplifiers, such that an appropriately limited signal amplitude is presented to the A/D converter 130 and 131. For example, due to the non-uniform gain changing steps of the TCA 114 and 115, a signal increase may result in a gain reduction or a gain increase at the BBA 122 and 123. Those of ordinary skill will appreciate these limitations, and, given a particular embodiment of the amplifiers and gain control step sizes, will be readily able to develop an appropriate look up table, i.e., a decoder, that can be used to convert the signal level at the output of the channel filter 146 and 147 to respective gain control signals 180, 181 and 182.

Gain replacement is used by the RF/IF AGC system 158 so that a well-controlled signal level is provided to the A/D converter 130 and 131 over as large a range of an RF signal amplitude as is practical. Gain replacement is used so that when the gain of the LNA 108 is decreased as a result of the RF signal increasing, by its step size, e.g., 16-dB, the gains of the TCA 114 and 115 and the BBA 122 and 123 are reset (at least one of the TCA and the BBA is increased), so that the signal level at the A/D converter 130 and 131 remains essentially equal to the level before the step change at the LNA 108. When the RF signal decreases enough to increase the gain of the LNA 108, e.g., by 16-dB, the gains of the TCA 114 and 115 and the BBA 122 and 123 will be similarly decreased.

Furthermore, each time a gain change occurs in the LNA 108, or in the TCA 114 and 115, or in the BBA 122 and 123, the coarse DCOC system 134 is expected to quickly remove or reduce any DC offset. Note that these gain changes, particularly large changes, necessarily change the DC offset. For example, any DC offset at the output of the quadrature mixer 118 and 119 is amplified by the BBA 122 and 123, and if the gain of these amplifiers change, the DC offset at the A/D converter 130 and 131 necessarily changes. While the closed loop operation of the coarse DCOC system 134 tracks, DC transients can cause clipping or other undesired nonlinear operation of one or more of the stages in a backend of the receiver 102.

The DAGC unit 150 normalizes the digital signal and preserves only the number of bits necessary for the demodulator to achieve the required link performance. In the exemplary embodiment, the DAGC unit 150 reduces the number of bits (i.e., the dynamic range) from fifteen (15) bits to eight (8) bits. Hence, the DAGC unit 150 converts a high dynamic range digital signal to a lower dynamic range digital signal regardless of the input signal level within the higher dynamic range digital signal. The DAGC unit 150 converts the high dynamic range digital signal to the lower dynamic range digital signal while preserving a minimum required signal-to-noise ratio in the lower range signal. An output of the DAGC unit 150 is coupled to an 8-bit external data interface 154 via 8-bit coupling 170 and 171. The 8-bit external data interface 154 is used to transfer the 8-bit I/Q words to an external baseband modem (not shown). A DAGC bandwidth controller 166 is coupled to the DAGC unit 150 via coupling 174. A DAGC system comprises the DAGC unit 150 and the DAGC bandwidth controller 166.

Figure 5:
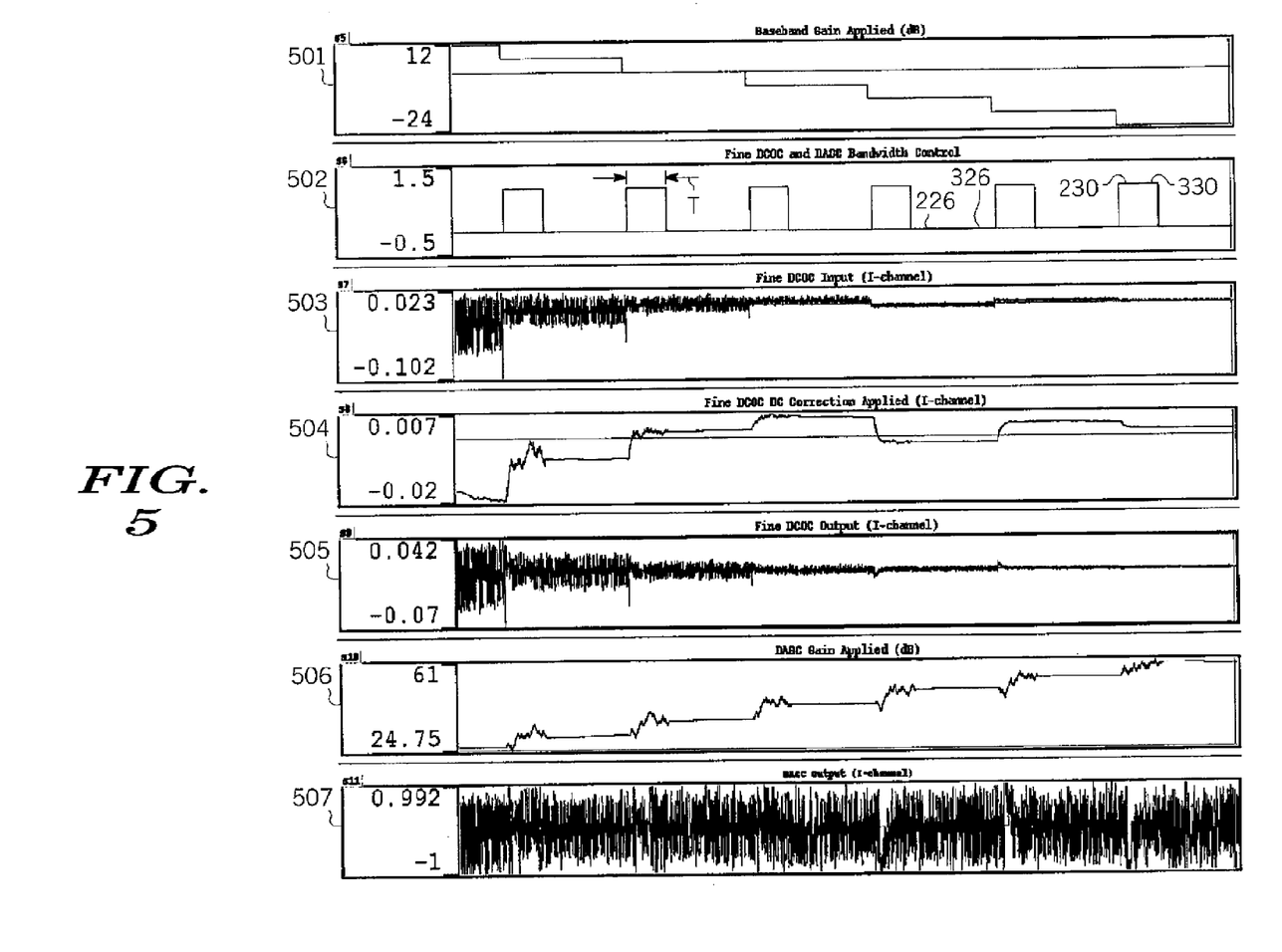
FIG. 5 is a set of graphs of simulated signals in the receiver of FIG. 1 that illustrate the performance of the receiver of FIG. 1.

The RF/IF AGC system 158 is used to control the gain of the at least one amplifier of the receiver 102. The RF/IF AGC system 158 performs the gain control in a manner to maintain a desired operating range in each stage of the receiver 102 to avoid over-driving or under-driving a given stage of the receiver. The at least one amplifier operates at one of a plurality of different gains. Whenever the baseband gain, or gain state, is changed by the RF/IF AGC system 158, open loop coarse DCOC values are automatically applied through the coarse resolution DCOC D/A converter 138 and 139. The coarse DCOC results in a coarse DC offset at the input to the fine DCOC filter 142 and 143. This DC offset should be quickly eliminated to preserve the required receiver EVM performance required by 3.5 G receivers such as that for HSDPA (spread 16-QAM/64-QAM modulation). The fine DCOC filter 142 performs this function. An example of a baseband gain setting 501 of the BBA 122 and 123 as a function of time is shown in FIG. 5. In this example, the baseband gain setting 501 decreases over time.

Referring again to FIG. 1, the virtual elimination of the DC offset is accomplished using a fine DCOC bandwidth controller 162. A fine DCOC system comprises the fine DCOC filter 142 and 143 and the fine DCOC bandwidth controller 162. The fine DCOC bandwidth controller 162 is coupled to an input of the fine DCOC filter 142 and 143, via coupling 164 and 165, respectively. The fine DCOC bandwidth controller 162 dynamically greatly increases the DC notch in the receiver 102 (for example, to 70-kHz) by increasing the bandwidth of the fine DCOC filter 142 and 143 to quickly track out DC transients introduced in the receiver under fading channel conditions, which is when the baseband gain setting may be frequently changed. Therefore, fine DCOC bandwidth controller 162 dynamically controls the DC notch width to maximize receiver performance under both static and fading channel conditions. The fine DCOC bandwidth controller 162 dynamically controls the bandwidth of the fine DCOC filter 142 and 143 as a function of when coarse DCOC updates are applied. Without a dynamic bandwidth control system, it would be difficult for the receiver 102 to continuously maintain a large DC notch at baseband during continuous HSDPA data reception to eliminate DC and gain transients without also contributing to EVM and network throughput system performance degradation. During normal HSDPA data reception mode, a DC notch that is lower than 1-kHz should be maintained.

The linear system transfer function of the DAGC unit 150 is also a high-pass filter response. Therefore, during continuous HSDPA data reception, the loop bandwidth of the DAGC 150 should also be kept very low (less than less than 1-kHz) to achieve desired receiver EVM performance targets (for example, approximately 5% EVM). Following RF or baseband gain changes, a gain error of 6-dB or higher can occur, due to AGC hysteresis range and variations in RF step sizes over temperature and supply voltage variations. Therefore, the DAGC bandwidth controller 166 dynamically alters the bandwidth of the DAGC unit 150 after the RF/IF AGC system 158 has updated the RF and/or baseband gain settings.

Figure 2:
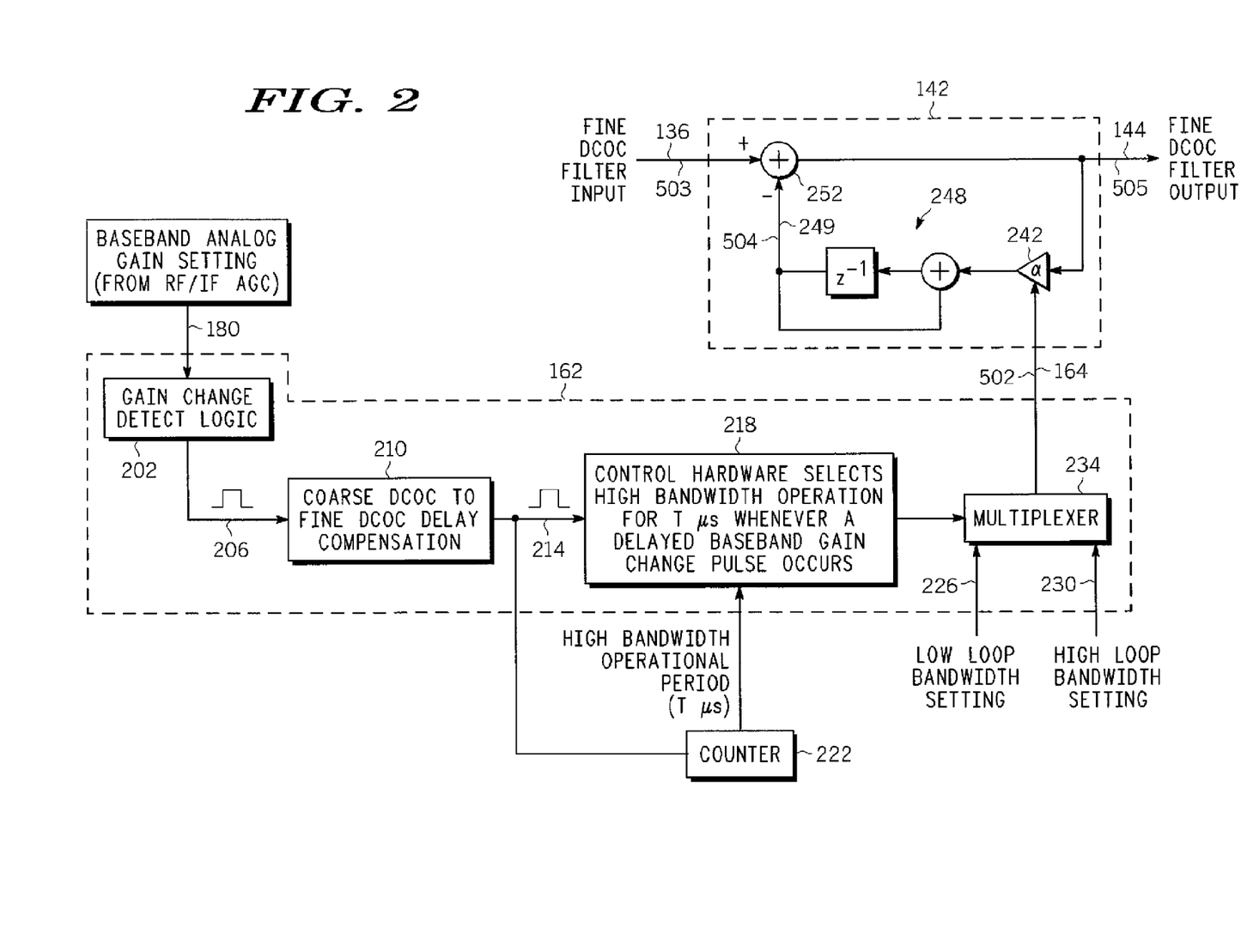
FIG. 2 is a simplified functional block diagram of a fine DC offset correction filter with dynamic bandwidth control, and a simplified functional block diagram of a fine DC offset correction bandwidth controller.

FIG. 2 is a simplified functional block diagram of the I-phase fine DCOC filter 142 with dynamic bandwidth control, and a simplified functional block diagram of the fine DCOC bandwidth controller 162. The Q-phase DCOC filter 143 is substantially similar to the I-phase DCOC filter 142; therefore, the Q-phase DCOC filter 143 will not be described in detail. The fine DCOC filter 142 includes a feedback loop having a feedback loop gain α. The feedback loop includes an amplifier 242, an integrator 248 and an adder 252. The integrator 248 comprises a one clock cycle delay element ($z^{-1}$) to perform an accumulation function. The integrator 248 is scaled by a value α of the feedback loop gain of the amplifier 242. The integrator 248 outputs a fine DCOC correction value 504 (see FIG. 5) to the adder 252 via coupling 249. The value of the feedback loop gain α determines the loop bandwidth of the fine DCOC filter 142. The value of α is between "0" and "1", so that the filter is stable. A smaller value for α provides more accurate tracking, but takes longer to settle. A larger value for α provides less accurate tracking but settles faster. With a sufficiently narrow bandwidth, which is affected, in part, by the value of α, the fine DCOC filter 142 advantageously corrects residual offsets from the coarse DCOC system 134 down to the least significant bit of resolution of the digital signal path. In contrast, the coarse DCOC system 134, without the fine DCOC filter 142, corrects the DC offset down to approximately the five or six least significant bits of resolution.

An input signal to the fine DCOC filter 142 comprises a received signal plus noise plus a DC offset component. The feedback inside the fine DCOC filter 142 estimates the DC content. The feedback is scaled (by α) and then averaged, i.e., integrated, to create a more accurate estimate of the DC offset. This estimate is then subtracted from the input at adder 252. The value of α is dynamically controlled by the fine DCOC bandwidth controller 162. The fine DCOC filter 142 (from input to output) functions as a high-pass filter. The value of α controls the bandwidth of the fine DCOC filter 142. A larger α means a wider bandwidth (faster, but less accurate, estimate of the DC offset); a smaller α means a narrower bandwidth (slower, but more accurate, estimate of the DC offset).

The bandwidth of the fine DCOC filter 142 is dynamically controlled by the fine DCOC bandwidth controller 162 following baseband analog gain changes applied by the RF/IF AGC system 158. The fine DCOC bandwidth controller 162 comprises a gain change detect logic 202 that detects a change in a baseband gain state (as applied by the RF/IF AGC system), and then, in turn, generates a pulse 206. The pulse 206 is delayed in delay circuit 210 to compensate for the propagation delay from the coarse DCOC system 134 to the fine DCOC filter 142. A second delayed pulse 214 is then used to enable a counter 222 that is active for a programmed first interval of time, e.g., T μsec (see FIG. 5). Control hardware 218 selects a high bandwidth mode of operation for T μsec whenever the second delayed pulse 214 occurs. While the counter 222 is active for T μsec, a high loop bandwidth setting 230 for the fine DCOC filter 142 is used. Subsequent to an end of the first interval of time of high loop bandwidth operation of T μsec, a low loop bandwidth setting 226 (see also FIG. 5), and a low loop bandwidth operation of the fine DCOC filter 142 is resumed. A multiplexer 234 outputs to the fine DCOC filter 142 one of: a larger value of α corresponding to the high loop bandwidth setting 230, and a smaller value of α corresponding to the low loop bandwidth setting 226.

Therefore, the fine DCOC bandwidth controller 162 controls the bandwidth of the fine DCOC filter 142. In the exemplary embodiment, the bandwidth is controlled by the fine DCOC bandwidth controller 162 that detects a change in the baseband gain. The bandwidth can also be controlled by a control signal directly from the RF/IF AGC 158. In either case, the control signal is then directed into control hardware 218 that selects a duration of the first interval of time necessary for the fine DC offset bandwidth to be placed in high loop bandwidth mode of operation. The high loop bandwidth setting is then conveyed to the fine DCOC filter 142, via a value of α, to adjust the bandwidth for the first interval of time.

Alternatively, there are additional detection circuits that contribute signals to the DCOC bandwidth controller 162 to determine when the DCOC bandwidth controller switches to the high bandwidth mode of operation. An example of such an additional circuit is a circuit that takes into account a current signal level of a received signal. In addition, the invention is not limited to two loop bandwidth settings. Alternatively, there are multiple loop bandwidth settings (i.e., the loop bandwidth could slowly step from high loop bandwidth to low loop bandwidth, rather than move abruptly between high loop bandwidth to low loop bandwidth).

Figure 3:
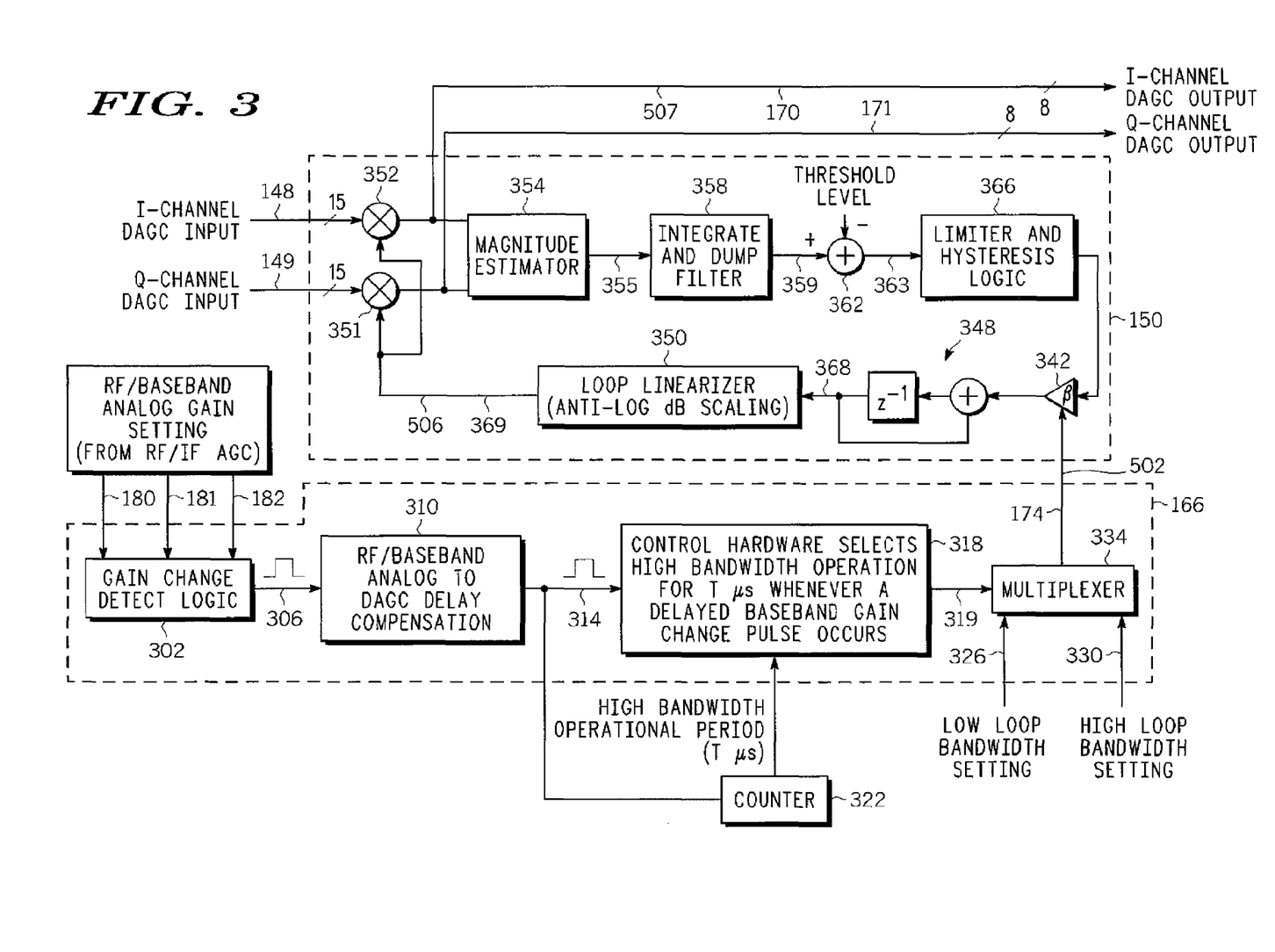
FIG. 3 is a simplified functional block diagram of a digital automatic gain control unit with dynamic bandwidth control, and a simplified functional block diagram of a bandwidth controller for the digital automatic gain control unit.

FIG. 3 is a simplified functional block diagram of the DAGC unit 150 with dynamic loop bandwidth control, and a simplified functional block diagram of the DAGC bandwidth controller 166. The DAGC unit 150 includes a feedback loop filter that comprises a gain stage, or amplifier, 342 and an integrator 348. The integrator 348 comprises a one clock cycle delay element (z−1) with an integrator loop. The integrator 348 is scaled by a value β of the feedback loop gain of the amplifier 342. The DAGC unit 150 includes a magnitude estimator 354 to produce an estimate 355 of the input quadrature signal 148 and 149. The DAGC unit 150 averages the estimate 355 using an integrate and dump filter 358 to produce an average estimate 359. The DAGC unit 150 compares the average estimate 359 to a fixed threshold level using the subtractor 362 to produce a comparison output signal 363. The DAGC unit 150 performs truncation of the comparison output signal 363 with signal chatter minimization using a limiter and hysteresis logic 366 and then further averages the control signal in the feedback loop filter. The feedback loop gain β controls the loop bandwidth. Thus, smaller values of β leads to lower loop bandwidths (i.e., slower settling but more accurate tracking). Alternately, larger values of β leads to higher loop bandwidths (i.e., faster settling but less accurate tracking). Following the feedback loop filter, the averaged control signal 368 is converted to an anti-log scale using a loop linearizer unit 350. This type of exponential scaling is desirable in the nonlinear control loop of the DAGC unit 150, which uses a multiplier 351 and 352. An output of the loop linearizer unit 350 is coupled to multiplier 351 and 352 via coupling 369. An exemplary output signal from the loop linearizer unit 350 is a DAGC gain applied setting 506 (see FIG. 5). The DAGC gain applied setting 506 is then employed to convert the incoming 15-bit signal range at its input to an 8-bit signal range at its output, using the multiplier 351 and 352, respectively. Within the smaller 8-bit signal range, the DAGC unit maintains the signal at a specified level such as 12-dB below the clip point of this signal range.

The bandwidth of the DAGC unit 150 is dynamically controlled in response to any RF and/or baseband analog gain change applied by the RF/IF AGC system 158. The DAGC bandwidth controller 166 comprises a gain change detect logic 302 that detects a change in the RF/baseband gain state (as applied by the RF/IF AGC system 158), and then, in turn, generates a pulse 306. The pulse 306 is delayed by a delay circuit 310 to compensate for a propagation delay from the RF/IF AGC system 158 to the DAGC unit 150. A second delayed pulse 314 is then used to enable a counter 322 that is active for a programmed second interval of time (e.g., T μsec). Control hardware 318 selects a duration of the second interval of time necessary for the fine DAGC unit 150 to be placed in the high loop bandwidth mode of operation. Upon occurrence of the delayed pulse 314, the control hardware 318 selects a high bandwidth mode of operation for T μsec. An output signal from the control hardware 318 is a DAGC bandwidth select signal 319, which is used to select an output signal from the multiplexer 334. A multiplexer 334 outputs to the DAGC unit 150 via coupling 174 one of a larger value of β corresponding to the high loop bandwidth setting 330, and outputs a smaller value of β corresponding to the low loop bandwidth setting 326. It should be noted that gain errors introduced into hysteresis ranges of the DAGC unit 150 are more critical when the gain errors have an amplitude of 6-dB or higher. While the counter 322 is active, the high loop bandwidth setting 330 for the DAGC unit 150 is used to quickly track out a 6-dB or higher gain error introduced into hysteresis ranges of the RF/IF AGC system 158. Subsequent to an end of the second interval of time of high loop bandwidth operation of T βsec, a low loop bandwidth setting 326 (see also FIG. 5), and a low loop bandwidth operation of the DAGC unit 150 is resumed.

Figure 4:
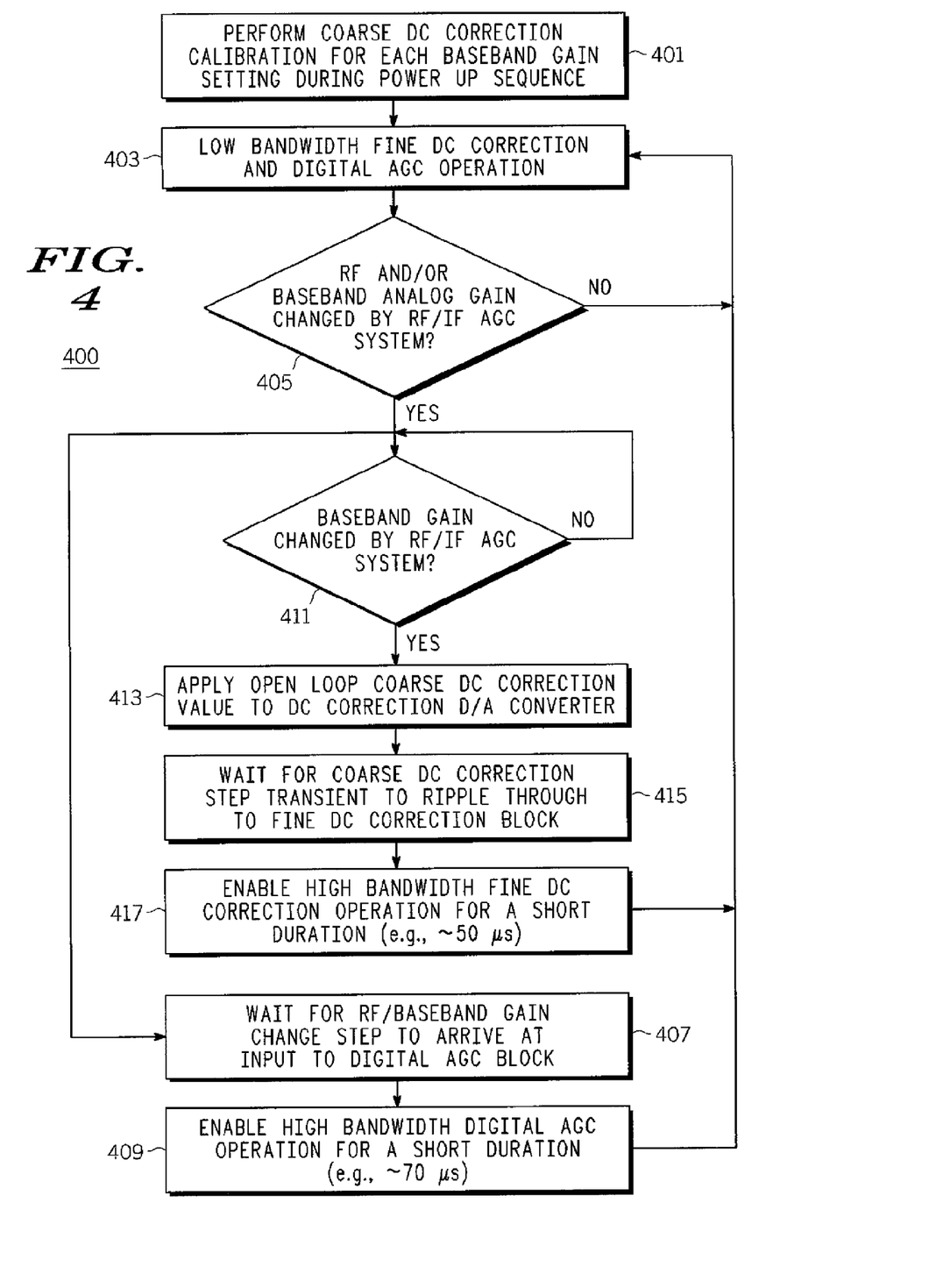
FIG. 4 is a flow diagram of a method of operation of an exemplary embodiment of the invention.

FIG. 4 is a flow diagram 400 of a method of operation of an exemplary embodiment of the invention. The steps in the method include first performing, at step 401, a power-up sequence of the receiver 102. The power-up sequence calibrates coarse DCOC values for each possible baseband analog gain setting, and stores these coarse DCOC values in the memory. Next, at step 403, the receiver 102 operates in a low bandwidth fine DCOC and a low bandwidth DAGC mode of operation. The low bandwidth modes of operation are the default modes. Then, at step 405, the DAGC system determines whether there occurred a RF and/or a baseband analog gain change that was caused by the RF/IF AGC system 158. If at step 405, it is determined that there were no RF and/or a baseband analog gain change made by the RF/IF AGC 158, the flow returns to step 403. On the other hand, if it is determined that the RF/IF AGC system 158 altered the RF and/or baseband analog gain setting during data reception, the flow continues to step 407. At step 407, the dynamic systems of the invention wait for the effect of the RF and/or baseband gain change step to arrive at the input to the DAGC unit 150. At step 409, the high bandwidth of the DAGC unit 150 is enabled for a short duration (e.g., approximately 70-μsec). Then, the flow returns to step 403. Referring again to step 405, if it is determined that the RF/IF AGC system 158 did alter the RF and/or baseband analog gain setting during data reception, the flow also continues to step 411. At step 411, a determination is made whether the RF/IF AGC system 158 made a change to the baseband gain. If the RF/IF AGC system 158 did not make a change to the baseband gain, this portion of the flow idles. On the other hand, RF/IF AGC system 158 made a change to the baseband analog gain, the flow continues to step 413. At step 413, the coarse DCOC system 134 applies a new open loop DC correction value (from the memory) to the DC correction D/A converter 138 and 139. Then, at step 415, the dynamic fine DCOC system waits for the coarse DC correction step transient to ripple through to the fine DCOC filter 142 and 143. At step 417, the bandwidth of the fine DCOC filter 142 is dynamically increased for a short duration (e.g., approximately 50-μsec). Then, the flow returns to step 403. In general, the duration of high bandwidth operation of the DAGC unit 150 is not necessarily the same as the duration of high bandwidth operation of the fine DCOC filter 142; however for simplicity, they may have a same duration. In general, the length of the duration is selected to allow a desired convergence in the loop under various strong and weak input signal conditions. The length of the duration is highly dependent on the application and input signal conditions.

Therefore, as an example, the bandwidth of the DAGC unit 150 is dynamically increased for approximately 70-μsec if either the RF gain or the baseband analog gain is altered by RF/IF AGC system 158. In addition, if the baseband gain is altered by the RF/IF AGC system 158, the fine DCOC filter 142 is also dynamically increased for approximately 50-μsec.

As another example, in the case that the RF receiver 102 receives a high-speed downlink packet access (HSDPA) signal, the bandwidth of the fine DCOC filter is dynamically increased to greater than 1-kHz for an interval of time of at least 25-μsec.

FIG. 5 is a set of graphs of simulated exemplary signals passing through the RF receiver 102, which illustrate simulated performance data 500. The first plot (i.e., top graph) in FIG. 5 shows the baseband analog gain setting 501 of the BBA 122 and 123 as the setting is applied by the RF/IF AGC system 158 over time, via coupling 190. The vertical axis of the first plot represents decibels. The second plot shows a control signal 502 that indicates when the fine DCOC filter 142 and the DAGC unit 150 are placed in high bandwidth setting 230 and 330 following a baseband analog gain setting change. It appears from the first plot 501 that the baseband analog gain setting 501 changes at periodic intervals; however, the plots of FIG. 5 are for pedagogical purposes, and it should be understood that the changes to the baseband analog gain setting, and to the resulting fine DCOC and DAGC bandwidth control signal 502, do not necessarily occur at regular intervals. The third plot shows the signal 503 at the input to the fine DCOC filter 142. In this simulation, the input signal 503 is consists of a weak WCDMA signal. The vertical axis of the third plot represents a signed digital signal level with a range between +1 and −1. In the third plot, the DC offset does change as a result of the baseband gain changes, in spite of the coarse DC corrections having been applied following the baseband gain changes. The fourth plot, which shows the fine DCOC correction value 504 as a function of time, demonstrates the dynamic tracking behavior of the fine DCOC filter 142. The vertical axis of the fourth plot represents a signed digital signal level with a range between +1 and −1. The fourth plot also demonstrates the rapid tracking behavior of the fine DCOC filter 142 whenever it is placed in a high bandwidth setting 230 and 330 following a baseband gain change. Without the dynamic bandwidth control capability, the associated DC transients following baseband gain changes would be very long because of a requirement to maintain a lower than 1-kHz DC notch for fine DCOC due to EVM performance requirements for HSDPA transceivers. The fifth plot shows the signal 505 at the I-channel output of the fine DCOC filter 142. The vertical axis of the fifth plot represents a signed digital signal range between +1 and −1. The sixth plot shows the dynamic behavior the digital gain applied setting 506 of the DAGC unit 150. The vertical axis of the sixth plot represents decibels. Note that the digital gain setting 506 increases as the baseband gain in the first plot decreases. As a result of dynamic bandwidth control, the DAGC 150 has fast gain error tracking following baseband gain changes. The seventh plot shows a normalized digital signal 507 that is fed into the 8-bit external data interface 154 via coupling 170 and 171, and subsequently, a demodulator (not shown) of the receiver 102. The vertical axis of the seventh plot represents a signed digital signal range between +1 and −1. The rapid DC and gain error tracking following baseband analog gain changes is also visible in the seventh plot. Without the dynamic bandwidth control of the fine DCOC filter 142 and DAGC unit 150, there would be long DC and gain compression transients in the final output signal shown in the seventh plot.

In one embodiment, whenever the RF/IF AGC system 158 alters the baseband analog gain setting 501, a new coarse DC correction is applied to the baseband analog receive path to maximize the dynamic range of the receiver 102. Following sufficient delay compensation after the coarse DCOC is applied, a control algorithm dynamically increases the bandwidth of the fine DCOC filter 142 and 143 for a short interval to quickly track out the resulting coarse DC offset introduced. Low bandwidth (less than 1-kHz) fine DCOC operation is resumed following this dynamic high bandwidth operation.

Whenever the RF/IF AGC system 158 alters the RF and/or baseband gain setting 501, the control algorithm dynamically increases the bandwidth of the DAGC unit 150, for a short interval to quickly track out receiver gain errors introduced. Receiver gain errors are introduced after each RF/IF AGC update due to hysteresis requirements and gain step errors of the DAGC unit 150 over temperature and/or voltage variations. Following the dynamic high bandwidth operation of the DAGC unit 150, low bandwidth (less than 1-kHz) operation is resumed to achieve desired receiver EVM performance.

The dynamic bandwidth control system of the exemplary embodiment helps the receiver 102 perform well under both static and fading channel conditions, by dynamically controlling the loop bandwidths of the fine DCOC filter 142 and 143 and of the DAGC unit 150 as a function of the RF and/or baseband analog gain being altered by the RF/IF AGC system 158.

The dynamic bandwidth control system has the ability to maintain a narrow DC notch (e.g., less than 1-kHz) in the receiver 102 to optimize performance (e.g., EVM) of the receiver under static channel conditions. The dynamic bandwidth control system has the ability to dynamically alter the DC notch of the receiver 102 to optimize performance (e.g., block error rate) of the receiver under fading channel conditions.

The fine DCOC bandwidth controller 162 dynamically controls the loop bandwidths of the fine DCOC filter 142 and 143, and DAGC bandwidth controller 166 dynamically controls the loop bandwidths of the DAGC unit 150, such that very low loop bandwidths (less than approximately 1-kHz) can be maintained in these circuits during continuous HSDPA data reception while RF and baseband gains are not changing. The performance of the receiver 102 is improved under static channel conditions (due to maintenance of low loop bandwidths) as well as under fading channel conditions (due to dynamic bandwidth control schemes).

The dynamic bandwidth control system includes a means for reducing any direct current component of the signal being processed by the receiver 102. The means for reducing further includes the coarse DCOC system for reducing any direct current component of the signal and the fine DCOC filter for further reducing any direct current component of the signal.

A method of the exemplary embodiment improves the performance of the receiver 102 under both static and fading channel conditions by dynamically increasing the bandwidth of the fine DCOC filter 142 and 143 for an interval of time, and by increasing the bandwidth of the DAGC unit 150 for another interval of time, following any RF and/or baseband gain changes applied by the RF/IF AGC system 158.

Dynamic control of the bandwidth of the fine DCOC filter 142 and 143 and dynamic control of the bandwidth of the DAGC unit 150 helps universal mobile telecommunications system (UMTS) or wideband code division multiple access (WCDMA) RF/IF transceivers achieve a receiver EVM of approximately 5% under on-channel signal-only test cases and approximately 10% for adjacent channel interferer test cases.

In the exemplary embodiment, the entire receiver 102, including the fine DCOC filter 142 and 143, the DAGC unit 150, the fine DCOC bandwidth controller 162 and the DAGC bandwidth controller 166, is on a single integrated circuit manufactured using complementary metal oxide semiconductor (CMOS) technology. In the exemplary embodiment, the operating frequency range of the receiver 102 is about 800-2000 MHz.

It should be understood that all circuitry described herein may be implemented either in silicon or another semiconductor material or alternatively by software code representation of silicon or another semiconductor material.

While the principles of the invention have been described above in connection with specific apparatus, it is to be clearly understood that this description is made only by way of example and not as a limitation on the scope of the invention. For instance, although the exemplary embodiment is shown for use with a zero-IF receiver, the exemplary embodiment can also be used with a very low-IF or a low-IF receiver, or with a receiver having any category of IF.

Although the exemplary embodiment is shown on a single integrated circuit manufactured using CMOS technology, the invention can also be used on a single integrated circuit manufactured using other manufacturing technologies. Although the exemplary embodiment is shown on a single integrated circuit the invention, is equally applicable when portions of the embodiment are on more than one integrated circuit. Although the exemplary embodiment is shown on an integrated circuit, the invention is equally applicable when the embodiment is on a circuit in a form other than an integrated circuit.

Accordingly, the specification and figures are to be regarded in an illustrative rather than in a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radio frequency (RF) receiver, comprising:
   at least one amplifier for amplifying by a gain a signal received by the RF receiver, the at least one amplifier operable at any gain of a plurality of gains;
   a coarse DCOC system for reducing any direct current component of the signal;
   a fine DCOC filter for further reducing any direct current component of the signal, the bandwidth of the fine DCOC filter being dynamically controlled by the occurrence of the change in the gain of the at least one amplifier; and
   a fine DCOC bandwidth controller for controlling the bandwidth of the fine DCOC filter, the fine DCOC bandwidth controller including,
      a gain change detect logic, for detecting occurrence of the change in the gain of the at least one amplifier, and, in response, generating a pulse,
      a delay circuit for delaying the pulse by an amount to compensate for a propagation delay of the signal through the coarse DCOC system of the RF receiver, and for outputting a delayed pulse,
      control hardware including a counter, responsive to the delayed pulse, for selecting a duration of an interval during which the bandwidth of the fine DCOC filter is increased in one or more steps, and
      a multiplexer, coupled to the control hardware, for outputting to the fine DCOC filter an increased bandwidth setting for the interval only, and otherwise for outputting to the fine DCOC filter a low bandwidth setting, thereby controlling the bandwidth of the fine DCOC filter.

2. The RF receiver of claim 1, also comprising an automatic gain control (AGC) system coupled to the at least one amplifier for controlling the gain of the at least one amplifier.

3. The RF receiver of claim 1, also comprising a digital automatic gain control (DAGC) unit having a bandwidth dynamically controlled by the change in the gain of the at least one amplifier.

4. The RF receiver of claim 3, also comprising an analog-to-digital converter, and in which the DAGC unit converts a high dynamic range digital signal to a lower dynamic range digital signal while preserving a minimum required signal-to-noise ratio in the lower dynamic range signal.

5. The RF receiver of claim 1, in which the RF receiver receives a high-speed downlink packet access (HSDPA) signal, and in which the bandwidth of the fine DCOC filter is dynamically increased to greater than 1-kHz.

6. The RF receiver of claim 1, in which the fine DCOC filter includes
   a feedback loop including an integrator, the feedback loop having a feedback gain, the feedback gain dynamically controlled by the output of the fine DCOC bandwidth controller.

7. The RF receiver of claim 6, in which the feedback gain of the feedback loop is one of a high loop bandwidth setting for performing fine DCOC, and a low loop bandwidth setting for default operation.

8. The RF receiver of claim 1, including a detection circuit that contributes, to the fine DCOC bandwidth controller, a signal level of a received RF signal, and in which the fine DCOC bandwidth controller also takes into account a current signal level of the received RF signal when controlling the bandwidth of the fine DCOC filter.

9. An integrated circuit, comprising:
   a radio frequency (RF) receiver, the RF receiver including at least one amplifier for amplifying by a gain a signal received by the RF receiver, the at least one amplifier operable at any gain of a plurality of gains;
   a digital automatic gain control (DAGC) unit for receiving an amplified signal from the at least one amplifier, the DAGC unit having a bandwidth dynamically controlled by a change in the gain of the at least one amplifier, the DAGC unit including,
      a feedback loop filter including a gain stage and a feedback loop including an integrator, a gain β of the gain stage being dynamically controlled by an output signal of a DAGC bandwidth controller, and
      a loop linearizer unit for converting an output of the feedback loop filter to an anti-log scale; and
   a DAGC bandwidth controller, the DAGC bandwidth controller including,
      a gain change detect logic, for detecting occurrence of the change in the gain of the at least one amplifier, and, in response, generating a pulse,
      a delay circuit for delaying the pulse by an amount to compensate for a propagation delay of the signal through the RF receiver from the at least one amplifier to the DAGC unit, and for outputting a delayed pulse, control hardware including a counter, responsive to the delayed pulse, for selecting a duration of an interval for a high bandwidth mode of operation of the DAGC unit, and a multiplexer, coupled to the control hardware, for outputting to the DAGC unit a larger value of gain β corresponding to a high bandwidth setting for the interval only, and otherwise for outputting to the DAGC unit a smaller value of gain β corresponding to a low bandwidth setting, thereby controlling the bandwidth of the DAGC unit.

10. The integrated circuit of claim 9, also comprising an automatic gain control (AGC) system coupled to the at least one amplifier for controlling the gain of the at least one amplifier.

11. The integrated circuit of claim 9, in which the at least one amplifier includes at least one RF amplifier and at least one baseband amplifier.

12. The integrated circuit of claim 9, in which the RF receiver includes a direct current offset correction (DCOC) filter for reducing any direct current component of the signal amplified by the at least one amplifier, the DCOC filter having a bandwidth dynamically controlled by occurrence of the change in the gain of the at least one amplifier.

13. The integrated circuit of claim 9, in which the gain β of the gain stage is one of a high loop bandwidth setting for performing digital gain normalization, and a low loop bandwidth setting for default operation.

14. The integrated circuit of claim 9, in which the DAGC unit includes a multiplier coupled to the I-phase signal path and another multiplier coupled to the Q-phase signal path, and in which the loop linearizer unit outputs, to the multipliers, a DAGC gain applied setting used to converted an incoming 15-bit signal at the input of the DAGC unit to an 8-bit signal at the output of the DAGC unit.

15. In a radio frequency (RF) receiver with at least one amplifier for amplifying by a gain a signal received by the RF receiver, the at least one amplifier operable at any gain of a plurality of gains, and a digital automatic gain control (DAGC) unit, a method comprising the steps of:

operating the DAGC unit at a loop bandwidth of less than or equal to 1-kHz;

detecting occurrence of a change in gain of the at least one amplifier;

waiting for an effect of the change in gain of the at least one amplifier to arrive at an input to the DAGC unit;

dynamically increasing the loop bandwidth of the DAGC unit to greater than 1-kHz;

operating the DAGC unit at the loop bandwidth of greater than 1-kHz for an interval of at least 25-μsec following occurrence of each change in gain of the at least one amplifier; and subsequent to the end of the interval of at least 25-μsec, resuming operating the DAGC unit at the loop bandwidth of less than or equal to 1-kHz.

16. The method of claim 15, in which the RF receiver includes an automatic gain control (AGC) system, and including, prior to the step of detecting, the step of the AGC system changing the gain of the at least one amplifier.

17. The method of claim 15, in which the RF receiver includes a coarse direct current offset correction (DCOC) system and a dynamic fine DCOC system, and including the steps of:

the coarse DCOC system applying a coarse DC correction;

waiting for an effect of the coarse DC correction to arrive at an input of the dynamic fine DCOC system; and dynamically increasing the loop bandwidth of a fine DCOC filter of the dynamic fine DCOC system for another an interval of time.

18. The method of claim 15, in which the step of operating the DAGC unit at the loop bandwidth of greater than 1-kHz for an interval of at least 25-μsec following occurrence of each change in gain of the at least one amplifier includes operating the DAGC unit at the loop bandwidth of greater than 1-kHz for an interval of up to 70-μsec following occurrence of each change in gain of the at least one amplifier.

19. The method of claim 15, in which the RF receiver includes a fine direct current offset correction (DCOC) system and an RF/IF automatic gain control (AGC) system, and in which the at least one amplifier includes a baseband amplifier, and including the steps of:

operating a fine DCOC filter of the fine DCOC system at a loop bandwidth of less than or equal to 1-kHz;

the RF/IF AGC system changing a gain of the baseband amplifier;

waiting for an effect of the change of the gain of the baseband amplifier to arrive at an input of the fine DCOC system; and enabling high bandwidth operation of the fine DCOC filter for at least 25-μsec.

20. The method of claim 19, in which the step of enabling high bandwidth operation of the fine DCOC filter for at least 25-μsec includes enabling operation of the fine DCOC filter at a bandwidth of up to 70-kHz for at least 25-μsec.

* * * * *